United States Patent
Vancamberg et al.

(10) Patent No.: US 9,947,092 B2
(45) Date of Patent: Apr. 17, 2018

(54) METHOD OF PROCESSING X-RAY IMAGES OF A BREAST

(71) Applicants: Laurence Vancamberg, Buc (FR); Giovanni Palma, Buc (FR)

(72) Inventors: Laurence Vancamberg, Saint Germain en Laye (FR); Giovanni John Jacques Palma, Jr., Issy les Moulineaux (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 83 days.

(21) Appl. No.: 15/024,310

(22) PCT Filed: Sep. 24, 2013

(86) PCT No.: PCT/IB2013/058821
§ 371 (c)(1),
(2) Date: Mar. 23, 2016

(87) PCT Pub. No.: WO2015/044711
PCT Pub. Date: Apr. 2, 2015

(65) Prior Publication Data
US 2016/0217568 A1  Jul. 28, 2016

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/11* (2017.01); *G06T 19/003* (2013.01);
(Continued)

(58) Field of Classification Search
CPC ......... G06T 7/0012; G06T 2207/30068; G06T 19/003; G06T 2207/30204; G06T 2200/24;
(Continued)

(56) References Cited

U.S. PATENT DOCUMENTS

| | | | | |
|---|---|---|---|---|
| 6,459,925 B1 * | 10/2002 | Nields | .................. | A61B 6/0435 128/915 |
| 6,733,458 B1 * | 5/2004 | Steins | .................. | A61B 8/0833 600/461 |
| 2004/0015070 A1 * | 1/2004 | Liang | .................. | G06F 19/3437 600/407 |
| 2006/0228015 A1 * | 10/2006 | Brockway | ............. | G06T 7/0012 382/132 |

(Continued)

OTHER PUBLICATIONS

International Search Report and Written Opinion for PCT/IB2013/058821, dated Jun. 17, 2014, 9 pages.

*Primary Examiner* — Li Liu

(57) ABSTRACT

A method of processing X-ray images of a breast (B), the method comprising the steps of —generating (GEN3DV) a 3D volume from a plurality of X-ray images, —processing (DETMC) the 3D volume and/or the plurality of X-ray images, —computing (DETMC-CTR), for each region of interest in the 3D volume, a 3D characteristic position of the region of interest, —computing (CALCTGT) at least one needle target 3D position from a plurality of said computed 3D characteristic positions, —associating (SELIMG-TGT) each needle target position with a target image, —displaying (DISP-IMG) a slice image on a graphical interface, and —if the current slice image is a target image, displaying (DISP-TGT) on the graphical interface a target marker indicating each needle target position associated with the displayed current slice image.

18 Claims, 10 Drawing Sheets

(51) Int. Cl.
    *G06T 19/00*     (2011.01)
    *G06T 7/11*     (2017.01)

(52) U.S. Cl.
    CPC ............... *G06T 2207/10112* (2013.01); *G06T 2207/30068* (2013.01); *G06T 2207/30096* (2013.01); *G06T 2207/30204* (2013.01)

(58) Field of Classification Search
    CPC ........... G06T 2207/10116; A61B 6/502; A61B 10/0233; A61B 6/463; A61B 8/0825; A61B 8/463; A61B 8/464; A61B 8/469; A61B 17/3403; A61B 2090/364
    See application file for complete search history.

(56) References Cited

U.S. PATENT DOCUMENTS

| | | | |
|---|---|---|---|
| 2007/0167801 A1* | 7/2007 | Webler | G06F 19/3437 600/459 |
| 2010/0104155 A1* | 4/2010 | Chen | G06T 7/0012 382/128 |
| 2011/0087110 A1* | 4/2011 | Nathan | A61B 5/053 600/476 |
| 2012/0022358 A1 | 1/2012 | Fischer | |
| 2012/0051620 A1 | 3/2012 | Fischer et al. | |
| 2012/0147010 A1* | 6/2012 | Schmidt | G06F 19/321 345/440 |
| 2014/0323854 A1* | 10/2014 | Takeda | G06T 7/73 600/424 |
| 2015/0287194 A1* | 10/2015 | Schoenmeyer | G06T 7/0012 382/128 |

\* cited by examiner

METHOD OF PROCESSING X-RAY IMAGES OF A BREAST

BACKGROUND

Technical Field

Embodiments of the present invention relate to X-ray mammography and more particularly to assistance tools for carrying out an X-ray-guided breast biopsy.

Description of Related Art

Microcalcifications are tiny specks of mineral deposits (calcium) that can be scattered throughout the mammary gland or occur in clusters. Commonly, they simply indicate the presence of tiny benign cysts, but can signify the presence of early breast cancer.

Suspicious microcalcifications are commonly punctured thanks to biopsy, which is a medical test commonly performed by a surgeon or an interventional radiologist involving sampling of cells or tissues for examination.

Ultrasound guided biopsy is preferentially performed, as it is a non-irradiating modality, but micro calcifications are often hard to detect with such techniques. On the contrary, micro-calcifications are well detected with X-rays, and that is why mammography is used to puncture suspicious microcalcifications clusters.

Before sampling the radiologist has to select a target point of the breast. The middle of a notch is placed at the selected target point, after firing a biopsy gun.

Selecting the target point may be carried out thanks too many image acquisition techniques.

A conventional procedure for X-ray guided biopsy is stereotaxy. This procedure, which is mainly performed in the case of breast biopsy, comprises the acquisition of two stereo views taken at two different angles, usually +15°/−15°. With stereotaxy, the target point selection is generally done by selecting one point in each of the two stereo views. These points shall correspond to the target projection in the stereo images.

Another procedure for X-ray guided biopsy is digital breast tomosynthesis (DBT). This procedure is considered as potentially more efficient to guide breast biopsy than conventional stereotaxy, since it provides a 3D representation of the breast.

For DBT biopsy, the radiologist navigates though the 3D image acquired to select the target point. With DBT, to select the target point, the radiologist has to go up and down in the 3D volume and select the slice and the pixel to maximize the probability of getting micro-calcifications in the samples.

However, such navigation is very time consuming for the radiologist and thus may significantly increase the duration of the biopsy.

In addition, the target point selected by the radiologist may be approximate, especially when microcalcifications form multiple clusters in different regions of the breast.

SUMMARY OF THE INVENTION

There is therefore a need for providing assistance tools to a radiologist to help him to select within a limited amount of time a target point to be used as a target for a notch during an X-ray guided breast biopsy.

It is therefore proposed a method of processing X-ray images of a breast, the method comprising the steps of: generating a 3D volume from a plurality of X-ray images, the 3D volume comprising a set of parallel slice images distributed along a main axis, processing the 3D volume or the plurality of X-ray images so as to detect at least one region of interest in the breast, computing a 3D characteristic position of each region of interest in the 3D volume, computing at least one needle target 3D position from a plurality of 3D characteristic positions, each needle target 3D position being a position where tissue contained in corresponding regions of interest can be sampled, associating each needle target position with a target image, the target image being the closest slice image to the needle target position along the main axis, displaying a current slice image on a graphical interface, and if the current slice image is a target image, displaying a target marker on the graphical interface indicating each needle target position associated with the displayed current slice image.

This method allows the operator to be offered needle target position where to perform a biopsy rather than deducing such needle target position after browsing slices images. As a consequence, the time consumed in determining a needle target position is reduced.

As patient's breast is maintained under compression during examination of the slice images, the less time the procedure takes the better and painless it is for the patient.

BRIEF DESCRIPTION OF THE DRAWINGS

Further features, goals and advantages will be highlighted in the following description which is not limitative and must be read in relation with the following figures.

Figure 2:
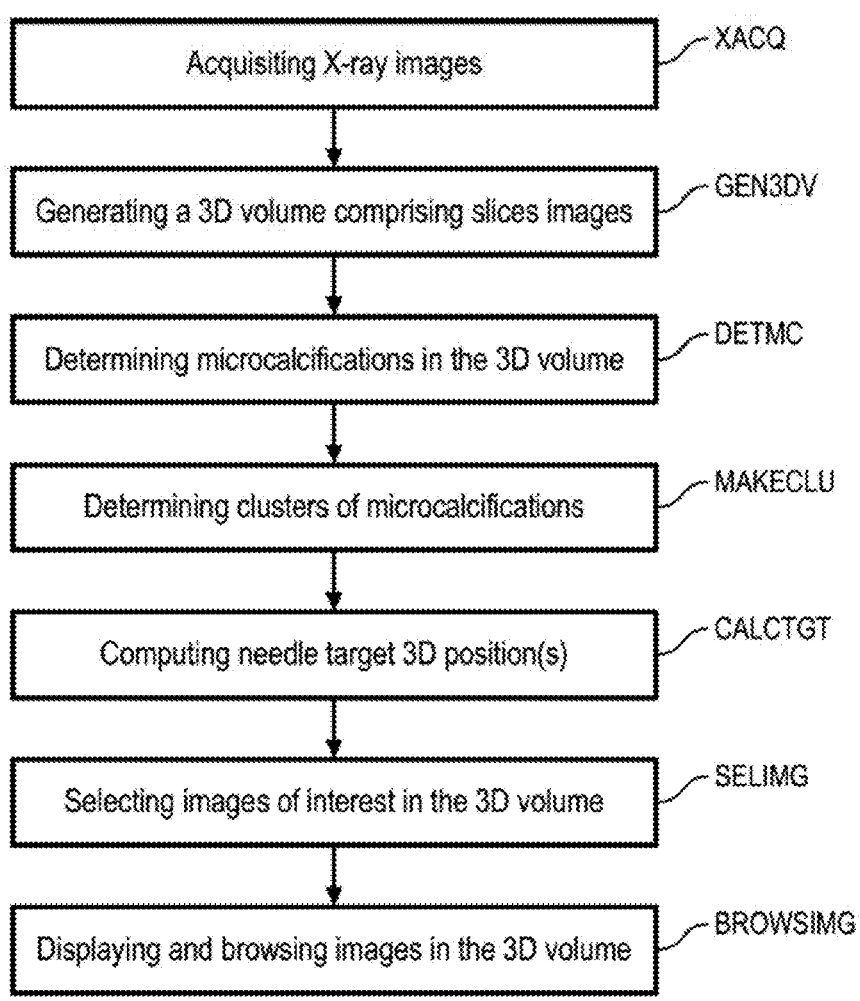
FIG. 2 represents steps of a method for processing X-ray images of a breast, according to an embodiment of the present invention.

Each of the FIGS. 4, 5, 6, 7, 8 and 9 detail optional steps of the method depicted on FIG. 2.

Figure 9:
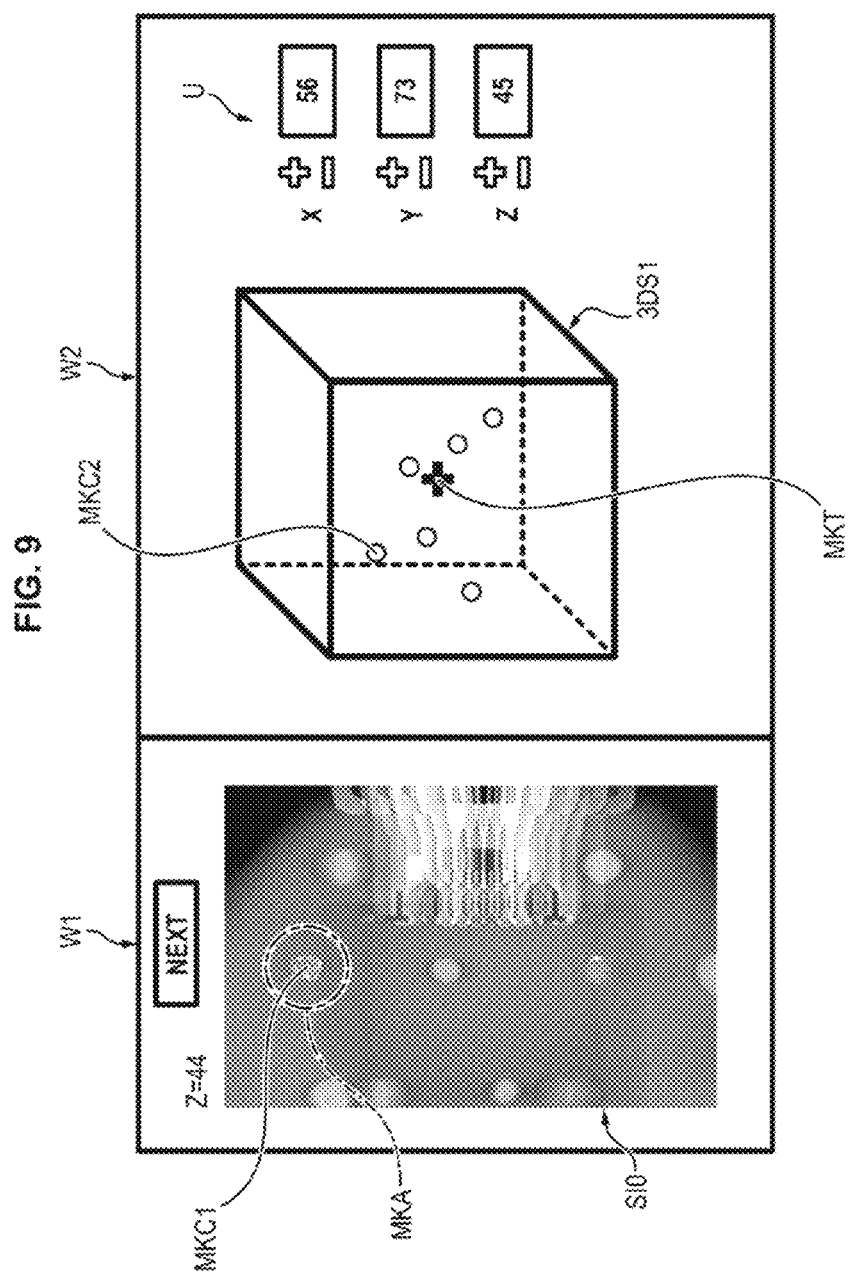

FIG. 9 represents graphical data displayed on a graphical interface when performing the method of FIG. 2 according to a first embodiment.

Figure 10:
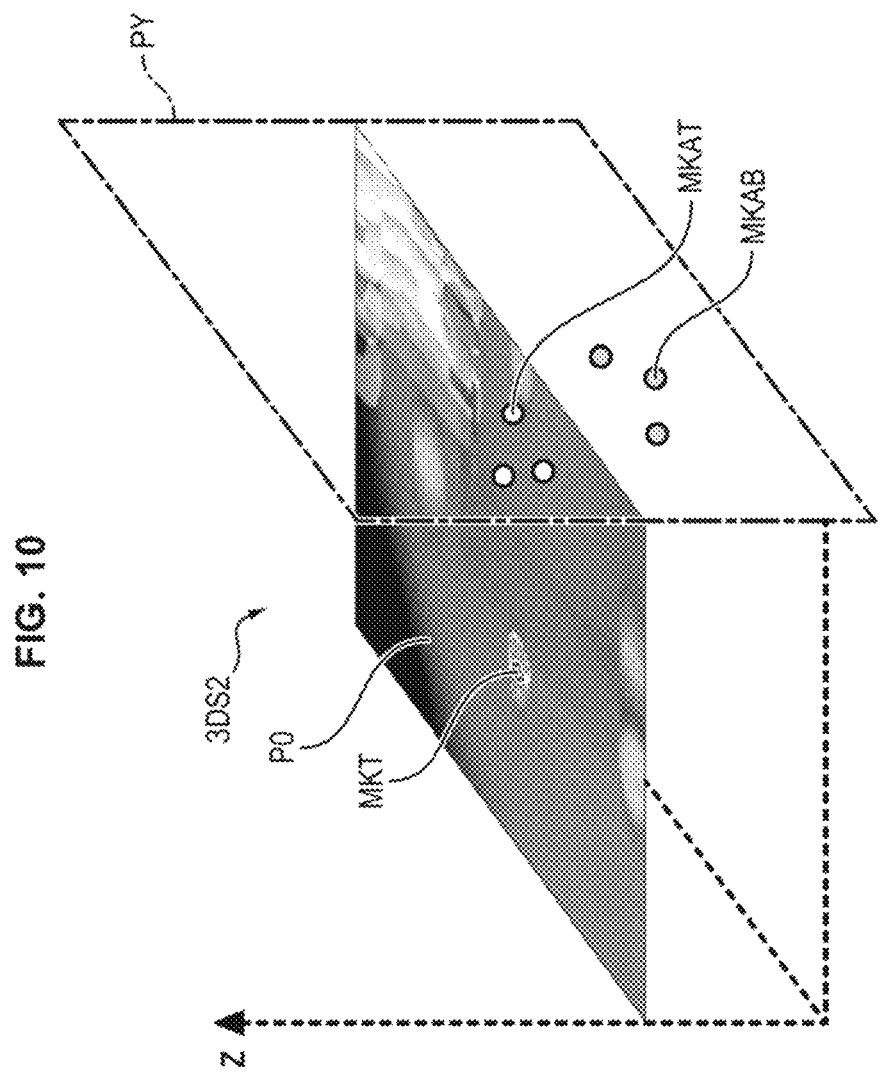
Figure 11:
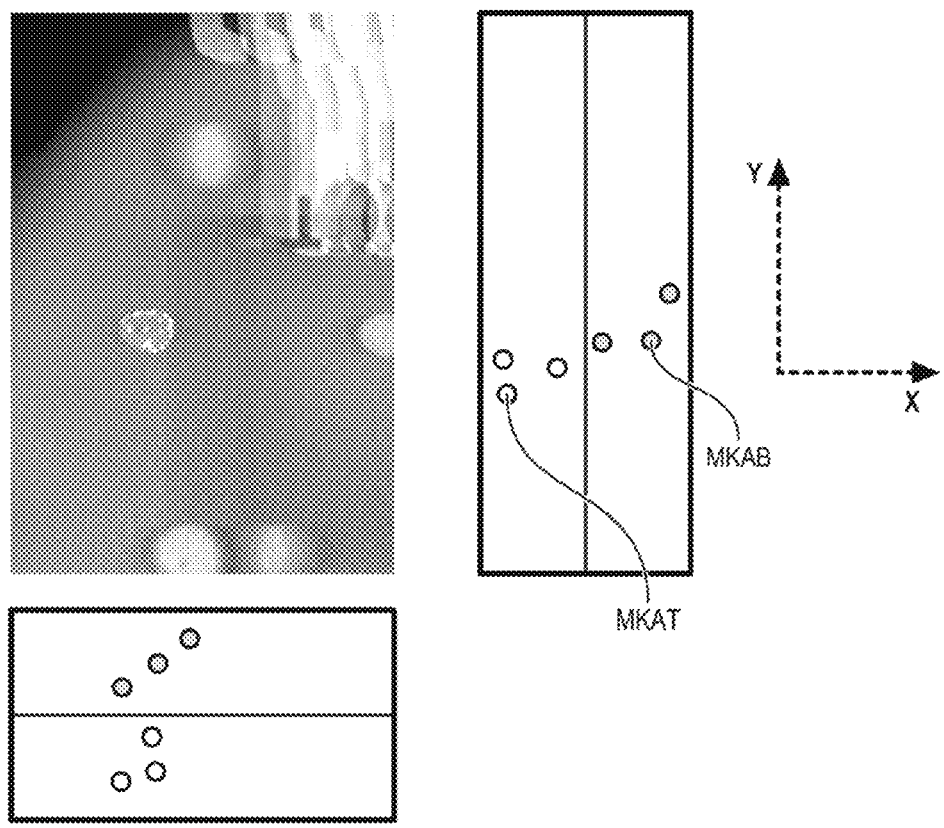
Figure 12:
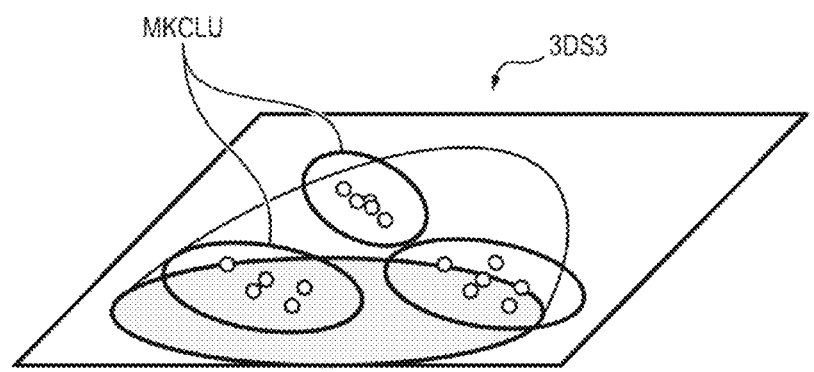

FIGS. 10, 11 and 12 partially represent graphical data displayed on a graphical interface when performing the method of FIG. 2 according to a second embodiment a third embodiment and a fourth embodiment, respectively.

On all figures similar elements have identical references.

DETAILED DESCRIPTION

Figure 1:
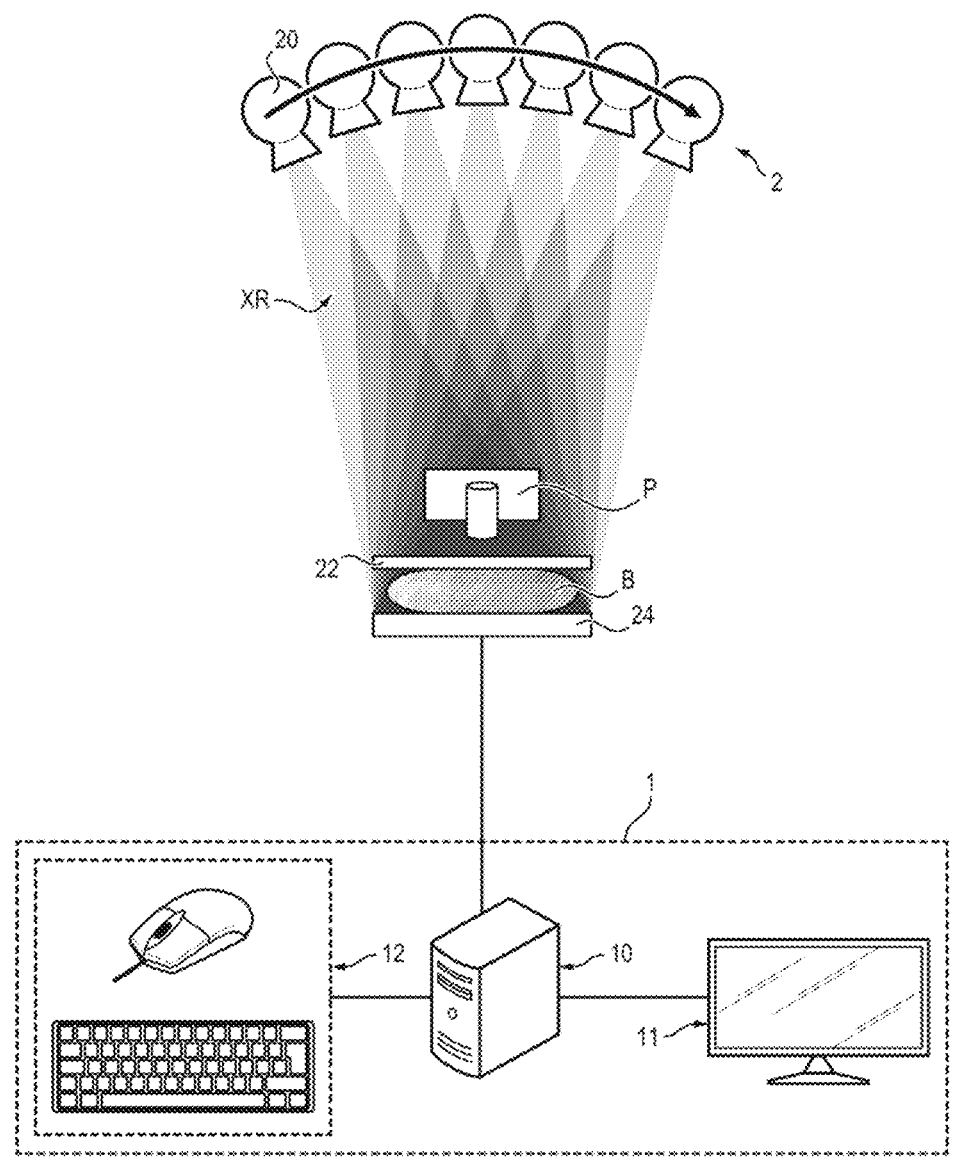
FIG. 1 schematically represents a system for carrying out a breast biopsy. [YSP1]

Referring to FIG. 1, a device 1 for processing X-ray images comprises an image processing unit 10, a graphical interface 11 and an input interface 12.

The image processing unit 10 is adapted to process X-ray images and display data on the graphical interface 11. It may comprise one or more processors and a memory storage unit adapted for storing X-ray images.

The graphical interface 11 is adapted to display images processed by the image processing unit: it may comprise one or many screens.

The input interface 12 is adapted for capturing event triggered by the operator: it may comprise a keyboard, a mouse, a touchscreen, or a combination of those. In the following, data inputted by an operator through the input interface 12 will be named "event". Events may be for instance: clicking on a displayed item, entering one or more keys through a keyboard, etc.

The image processing unit is typically coupled with an X-ray device 2 adapted for acquiring X-ray images of a human breast.

The X-ray device 1 illustrated on FIG. 1 is adapted to perform a digital breast tomosynthesis; it comprises a mobile X-ray tube 20, a breast compression device 22, and a detector 24 in communication with the processing unit 10.

Besides, the processing device 1 may be coupled to a biopsy positioner P comprising a needle configured for sampling tissue from a breast.

X-Ray Images Acquisition

Referring to FIG. 2, the X-ray device 2 captures in a preliminary step XACQ a plurality of raw X-ray images of a human breast. For this purpose, the X-ray tube emits an X-ray beam XR towards a breast B maintained between the compression device 22 and the detector 24 and is moved along a path. In the same time, the detector 24 captures a plurality of X-ray images.

The acquisition step may also be done thanks to other techniques such as stereotaxy. If the X-ray device 2 supports stereotaxy, two stereo images are acquired at two different positions.

In a step GEN3DV a 3D volume V is constructed from the raw X-ray images by the image processing unit. An example of such 3D volume V is schematically represented on FIG. 3.

The 3D volume V comprises a plurality of parallel slice images $SI1, \ldots, SIj, \ldots, SIN$, distributed along a common axis Z.

Each slice image is defined by an axis X and an axis Y which are both orthogonal to the Z-axis. The parallel slice images may be for instance regularly distributed along the axis Z by a predetermined step or irregularly distributed.

In the following, one-dimensional positions along the Z axis will be referred to as "Z-positions".

Figure 3:
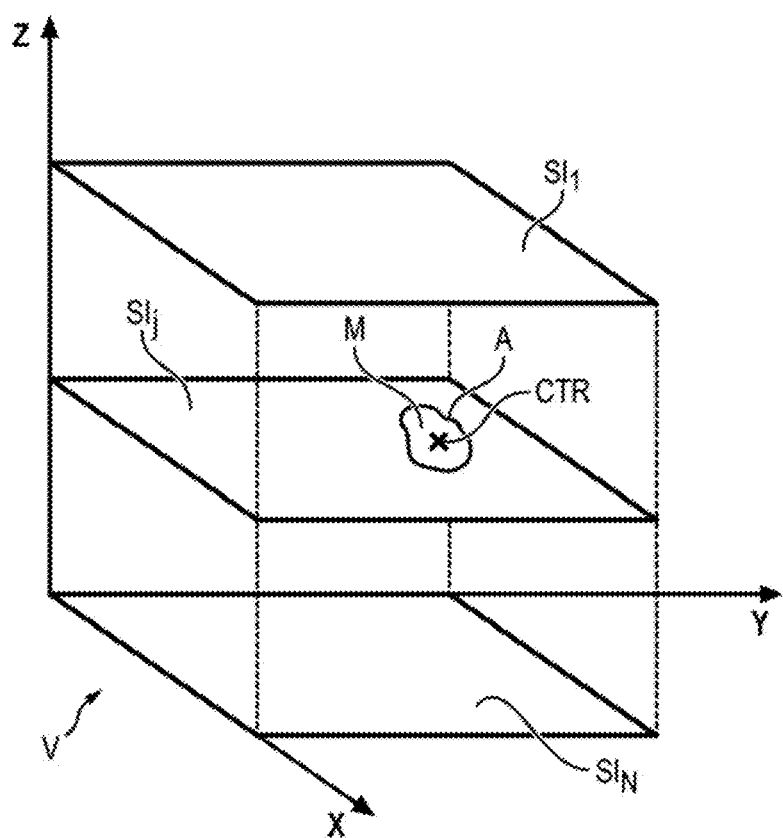
FIG. 3 represents an example of 3D volume processed when performing the method of FIG. 2.

Each slice image shows a section of the inspected breast located at a specific Z-position. Since regions of interest in the breast such as microcalcifications are three dimensional, each slice image may possibly show one or many sections of regions of interest. For example, the slice image referenced SIj on FIG. 3 shows an area A containing a section of a microcalcification M.

Detection of Regions of Interest

In a step DETMC, at least one region of interest is detected in the 3D volume V by analyzing the contents of the slice images and/or the raw X-ray images.

In the following the particular case of microcalcifications as regions of interest will be described. However, all the steps described hereafter can be applied for other types of regions of interest in the breast.

Figure 4:
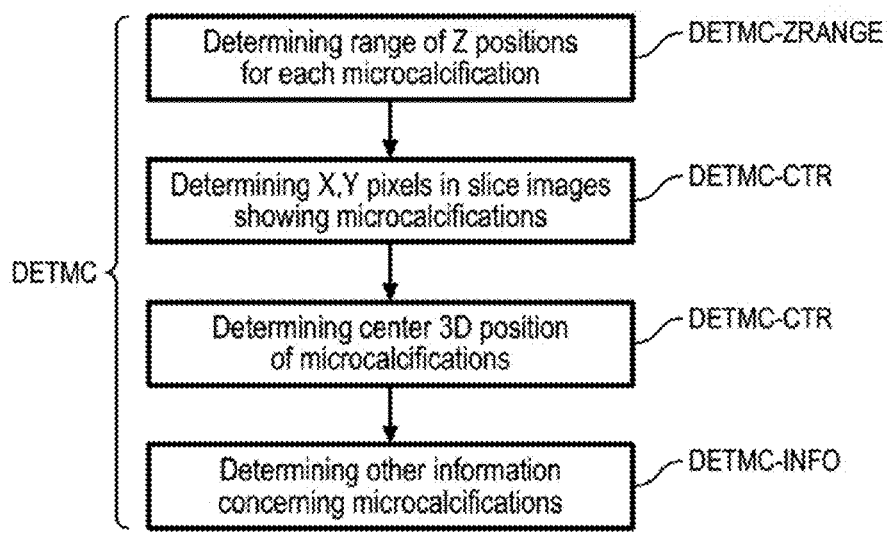
Figure 5:
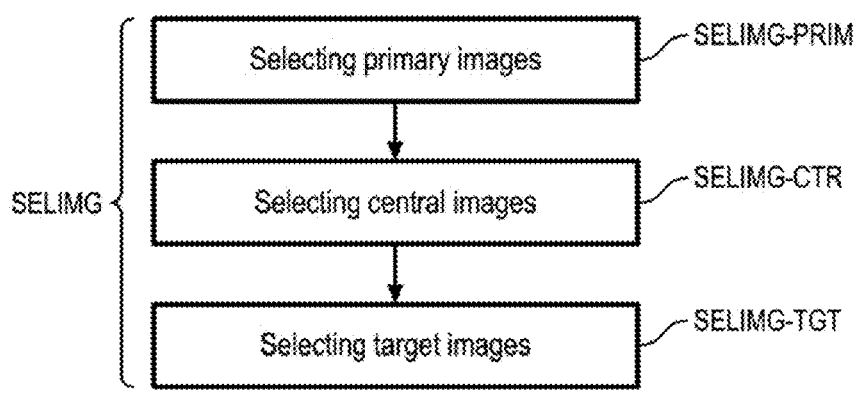

Referring to FIG. 4, the step DETMC may comprise a sub-step DETMC-CTR of computing a plurality of 3D characteristic positions, each 3D characteristic corresponding to a respective microcalcification. For instance, 3D characteristic positions are central positions of microcalcifications.

Each 3D characteristic position is for instance defined by a triplet of Cartesian coordinates along axes X, Y and Z. As an example, a 3D position CTR has the same Z-coordinate as the slice image SIj illustrated on FIG. 3.

The step DETMC may also comprise a sub-step DETMC-ZRANGE executed for each detected microcalcification and determining a range of Z coordinates along the axis Z in which the microcalcification is located.

The step DETMC may also comprise a sub-step DETMC-XYAREA executed for each slice image and each detected microcalcification, determining at least one area of pixels showing the microcalcification in the slice image.

Other information may also be computed in a step DETMC-INFO for each detected microcalcification, such as size information (for instance an average radius from the center position) and/or severity information, for instance a probability of presence of breast cancer or any other disease.

In a step CALCTGT, at least a needle target position T is computed after the step DETMC. Each needle target position T is a 3D position within the breast where a needle will be planted and from where tissue of the detected microcalcification will be sampled.

The step CALCTGT may be carried out in different ways.

In an embodiment, the needle target position is the barycenter of the plurality of associated microcalcification positions. This embodiment is simple and fast to execute.

In another embodiment, the needle target position is a position maximizing the probability to have micro-calcification in samples collected therefrom. This embodiment takes the needle into account and it is particularly beneficial if the needle comprises a lateral notch through which suspicious tissue is collected.

In addition to the 3D target position, a target half-line passing through the 3D target position may also be determined in step CALCTGT, the target half-line having a direction in space optimizing the sampling of tissue. The half-line may then be used by the biopsy positioner P for aligning the needle along the half-line and planting the needle into the breast by translating it along the half-line towards the needle target position.

[YSP2] In an optional step MAKECLU, microcalcification clusters may be constituted before performing the step CALCTGT, each cluster forming a restricted region of the 3D volume V containing one or many microcalcifications. This step MAKECLU may be performed thanks to image segmentation techniques on the X-ray images and/or the 3D volume V. Clusters may also be constituted by examining information computed during the step DETMC.

The step CALCTGT is performed for each constituted cluster and a needle target position is computed from the plurality of associated characteristic positions.

Grouping microcalcifications into clusters allows to operator to focus on global regions of interest in the breast and determining a limited number of needle target position, rather than determining as many needle positions as the number of detected calcifications.

Selection of Images of Interest

Each microcalcification is three-dimensional. Therefore, each microcalcification is shown on at least one slice image of the 3D volume V. But some slice images may not show any microcalcification.

In a step SELIMG, a set of images of interest is selected among the slice images of the 3D volume V. Different types of images of interest will be described in relation with FIG. 5.

First, the step SELIMG may comprise a sub-step referenced SELIMG-PRIM of selecting a set of primary images, each primary image showing at least a portion of at least one microcalcification. This step referenced SELIMG-PRIM may be carried out as follows: comparing the Z-position of each slice in the 3D volume V with the Z-range of the microcalcification computed during step DETMC-ZRANGE, and electing as primary images slice images having a Z-position contained in the Z-range of the microcalcification.

Primary images are slice images of interest for the operator since at least a portion of a microcalcification appears on each of them. For instance, the slice image SIj of FIG. 3 is a primary image.

A finer-grained selection may also be performed among the primary images. In a step SELIMG-CTR, a set of central images is selected among the slice images, each central image showing the center position of a microcalcification (this sub-selection may also be performed among the primary images after the step SELIMG-PRIM in order to speed-up its execution).

Selecting central images may for instance be performed with the following sub-steps performed for each microcalcification characteristic position: comparing the Z-position of the microcalcification position computed during step DETMC-CTR with the Z-position of each primary image in the 3D volume V, finding the closest slice image to the microcalcification along the Z axis, and electing the found primary image as a central image.

As an example, the slice image SIj of FIG. 3 is a central image because it contains a characteristic position CTR, which is its center.

Besides, in a step SELIMG-TGT, a set of target images can be selected among the slice images of the 3D volume V, each target image showing a needle target position.

Selecting target images may for instance be performed with the following sub-steps performed for each computed needle target position: comparing the Z-position of the needle target position (computed during step CALCTGT) with the Z-position of each slice image in the 3D volume V, finding the closest slice image to the needle target position along the Z axis, and electing the found slice image as a target image.

It should be noted that some target images may not be primary images; therefore, each target image may also be elected as a primary image.

Rather than using a closest image along the axis Z as target image, a new slice image may alternatively be generated in the 3D volume V at the computed needle target Z position and selected as target image.

Displaying Slice Images

Slices images are then displayed on the graphical interface 11 in the step BROWSIMG.

In an embodiment illustrated on FIG. 9, one current slice image SI0 and some additional information are displayed simultaneously in a first window W1 on the graphical interface 11. The first window W1 has a fixed size; it covers only a portion of the graphical interface 11 or be full-screen.

Figure 6:
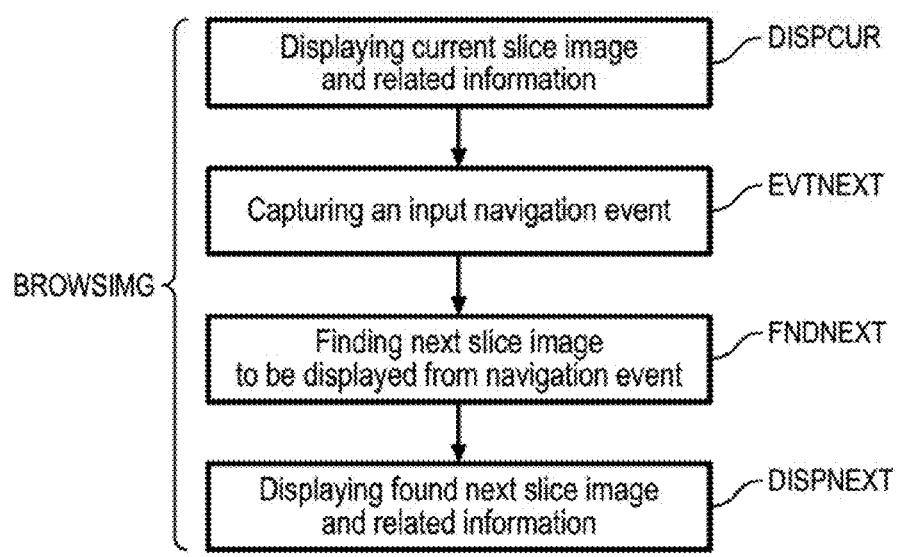

The expression "display a slice image" image should be understood as displaying a slice image in its entirety or a portion of it, plus additional information (this global step is referenced DISPCUR on FIG. 6).

Figure 7:
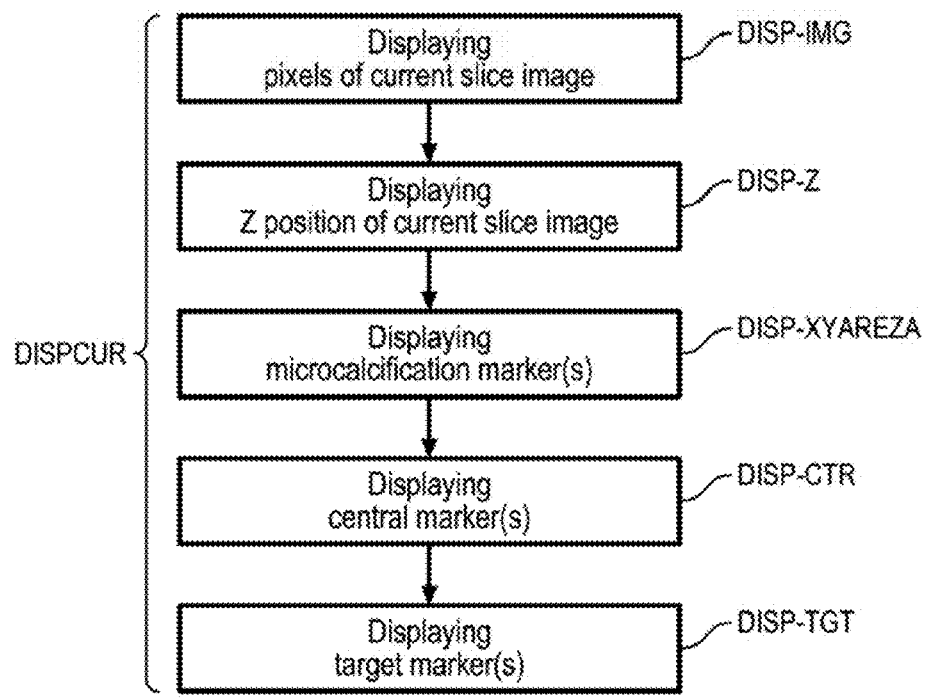
Figure 8:
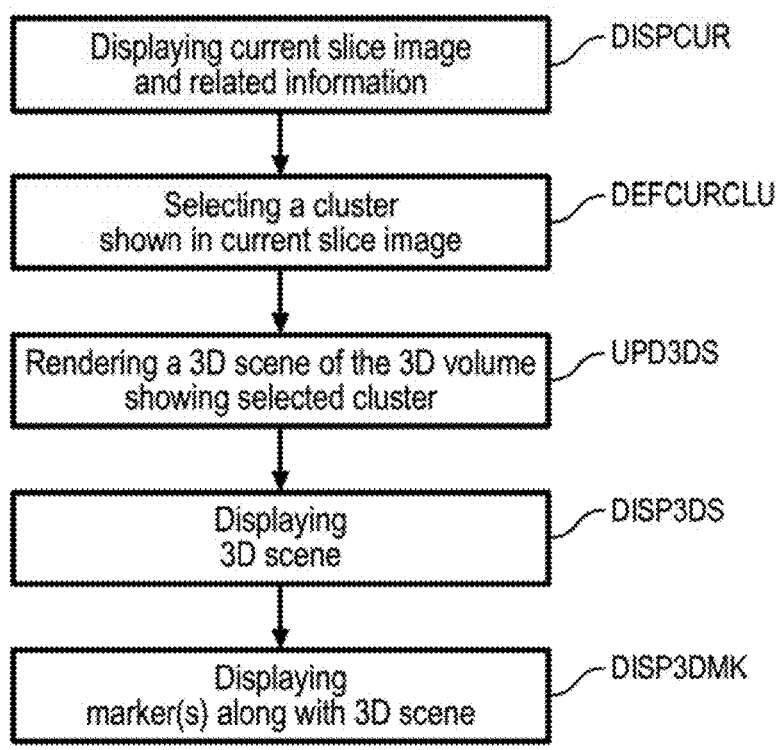

Referring to FIG. 7, the step DISPCUR comprises displaying at least a portion of the current slice image SI0 in the sub-step DISP-IMG.

The step DISPCUR also comprises a sub-step DISP-Z of displaying the Z-position of the current primary image, in order to help the operator locate the current image in the breast (on FIG. 9 the slice image SI0 has a Z-position equal to 44).

Besides, different markers helping the operator identifying microcalcification(s) in the current image may be displayed other sub-steps. Here are possible marker types.

A "marker of interest" indicates an area containing a section of a region of interest (e.g. a microcalcification) in the plane (parallel to axes X and Y) of the current slice image SI0. Such marker may be for instance a circle circling the section. Such marker is displayed in the sub-step DISP-XYAREA, whenever the current slice image is a primary image.

A "central marker" indicates the position of a region of interest (e.g. a microcalcification) in the (X,Y) plane of the current slice image SI0. Such marker may be for instance a cross the intersection of which is the characteristic position of the related region of interest, or a circle the center of which matches the characteristic position of the related region of interest. Such marker is displayed in the step DISP-CTR, whenever the current slice image is a central image.

A "target marker" indicates a needle target position in the (X,Y) plane of the current slice image SI0. Such marker is displayed in the step DISP-TGT, whenever the current slice image is a target image.

Sub-steps DISP-XYAREA, DISP-CTR and DISP-TGT may be performed many times depending on the number of microcalcifications and clusters shown in the current slice image, and the type of the current slice image (ordinary slice image, primary image, central image or target image).

Browsing the 3D Volume

Referring to FIG. 6, switching from the current slice image Si0 to another slice image may be carried out with the following steps: in a sub-step EVTNEXT a navigation event inputted by the operator is captured by the input interface, in a sub-step FNDNEXT a new slice image is searched for in the 3D volume V, the new slice image depending on the navigation event, in a sub-step DISPNEXT the new primary image and new additional information is displayed in replacement of the current primary image and the current additional information (the step DISPNEXT therefore comprises the same sub-steps than the step DISPCUR, performed for another slice image).

The navigation event can be for instance pressing a button "NEXT" displayed on the graphical interface 11, as illustrated on FIG. 9.

Many browsing strategies can be offered to the operator; each strategy being triggered whenever capturing a specific navigation event.

According to a conventional navigation mode, the operator browses all slice images along the Z axis. This navigation comprises the following sub-steps whenever a first navigation event inputted by the operator is captured by the input interface: finding a first slice image of the 3D volume V, the second slice image being next to the current slice image along the Z axis, displaying the first slice image in replacement of the current primary image.

According to a second navigation mode, the operator browses the primary images only. This allows the operator to focus on images of interest rather than checking all slices of the 3D volume V, which can be very long in the case of high-resolution acquisitions resulting in 3D volume V having a huge number of slice images. This navigation may thus comprise the following sub-steps, whenever a second navigation event inputted by the operator is captured by the input interface: finding a second slice image, the second slice image being a primary image which is next to the current slice image along the Z-axis, displaying the second slice image in replacement of the current primary image.

According to a third navigation mode, the operator browses the target images only. This navigation may thus comprise the following sub-steps, whenever a third navigation event inputted by the operator is captured by the input interface: finding a third slice image, the third slice image being a target image which is next to the current slice image along the Z-axis, displaying the third slice image in replacement of the current primary image.

This third navigation mode allows the operator to have an overall view of clusters that have been previously detected and the number of target position proposed.

All navigations modes may be combined and applied whatever the type of the current slice image. In an embodiment, the following eight buttons may be displayed alongside the current slice image in order to browse the slice images of the 3D volume V: One "NEXT SLICE" button used for displaying the next slice image in the 3D volume V, One "PREVIOUS SLICE" used for displaying the previous image in the 3D volume V, One "NEXT MC" button used for displaying the next primary image in the 3D volume V, One "PREVIOUS MC" button used for displaying the previous primary image in the 3D volume V, One "NEXT CENTER" button used for displaying the next central image in the 3D volume V, One "PREVIOUS CENTER" button used for displaying the previous central image in the 3D volume V, One "NEXT TGT" button used for displaying the next target image in the 3D volume V, One "PREVIOUS TGT" button used for displaying the previous target image in the 3D volume V.

The operator is thus given various browsing strategies. In particular, the operator can navigate slice by slice in the vicinity of a microcalcification in order to check if the microcalcification is relevant.

Editing Positions of Interest

Each central position characteristic position may be updated or suppressed whenever an edition event is captured by the input interface 12, for instance pressing a dedicated button displayed on the graphical interface 11 or directly moving a corresponding marker according to a "drag-and-drop" technique.

Besides, undetected microcalcifications may be manually added by the operator on the current slice image. This may be performed by selecting a specific pixel of the current image and/or inputting (x,y) coordinates.

Whenever a microcalcification addition event is captured, the current slice image is elected as a primary image and a central image and a corresponding central position characteristic position is computed.

The step MAKECLU may be the re-run after editing microcalcifications in order to assign the added microcalcification to a cluster. Either a new cluster containing the added microcalcification is created or the added microcalcification is assigned to an existing cluster.

Whenever a microcalcification position is updated or suppressed or added, the corresponding needle position may then be updated accordingly as well as the associated target image. Position changes performed by the operator are thus taken into account for determining the needle target position. Similarly, each needle target position may be directly updated whenever a dedicated user event is captured.

Editing computed positions is important since detection algorithms are not perfect. Indeed, some microcalcifications may be overlooked; some detected positions may not be microcalcification, etc.

Displaying a 3D Scene of the 3D Volume V

In the embodiment illustrated on FIG. 9, two windows are displayed simultaneously on the graphical interface 11: the first window W1 already discussed (containing the current slice image SI and some additional information), and a second window W2 in which a 3D scene 3DS1 is displayed, the 3D scene representing a portion of the 3D volume V.

Since microcalcifications are three-dimensional, this 3D scene allows the operator to get a clear picture of each microcalcification size (even along the Z axis) and how microcalcifications are scattered in the breast.

The 3D scene may focus on a cluster already displayed in the current slice image displayed in the first window. This may be achieved with the following additional steps, whenever the current slice image displayed in the first window is a primary image during the step DISPCUR: In a step DEFCURCLU, selecting a cluster containing at least a microcalcification highlighted in the primary image SI0 thanks to a marker, In a step UPD3DS, computing or updating a 3D scene of the 3D volume V corresponding to the region of the cluster, in a step DISP3DS, displaying the computed 3D scene in the second window W2, In a step DISP3DMK, displaying in the second window W2 any marker associated with the cluster displayed in the 3D scene.

This sequence may be performed whenever the content of the first window W1 is updated (after editing a position, switching to another slice image, etc.).

In the example depicted on FIG. 9 a central marker MKC1 and a marker of interest MKA are displayed in the window W1 in addition to the image SI0; a cross-shaped target marker MKT is then displayed as well as a plurality of spherical central markers MKC2 in window W2 associated with the same cluster, when executing the sequence described above. The markers MKC1 and MKC2 point on the same characteristic position in the breast.

If the current slice image SI0 is a primary image associated with many clusters, the cluster selection step DEFCURCLU may comprise the capture of a selection event triggered by the operator such as clicking on a marker of interest corresponding to a cluster to be displayed in the 3D scene.

Whenever capturing an update event triggered by the operator, the needle target position may be updated, the target marker moved accordingly in the displayed 3D scene, and the associated target image updated. A set of widgets may for instance be displayed along with the 3D scene, each widget controlling a coordinate of the needle target position along an axis (X, Y and Z axes respectively), as well as the current coordinates of the target position along these axes.

Whenever the needle target position is updated, the current slice image and markers displayed in the first window may be replaced with the target image (and corresponding markers) corresponding to the updated needle target position.

The current slice image SI0 displayed in the first window may also be set to a central image corresponding to a microcalcification or a central marker displayed in the 3D scene 3DS1.

The 3D scene may be rotated by the operator, for instance thanks to a "drag-and-drop" technique.

In the embodiment depicted on FIG. 9, the 3D scene 3DS1 is a cubical portion of the volume 3DV, the faces of the cube being aligned with the X, Y and Z axes. The 3D scene 3DS1 contains only geometrical information; the 3D scene is generated from computed positions only.

Another embodiment 3DS2 for the 3D scene is depicted on FIG. 10. The scene 3DSD2 is similar to the scene 3DS1 but also comprises a projection PO of the current slice image SI0 included in the cube in order to highlight the relationship between the 2D information displayed in the first window and the 3D scene.

Besides, central markers associated with the current cluster displayed in the 3D scene 3DS2 may be divided into two groups that are visually distinguishable from each other: a first group of central markers MKAT associated with a Z-position greater than the Z-position of the current slice image SI0, and a second group of central markers MKAB associated with a Z-position smaller than the Z-position of the current slice image SI0.

In the current slice image SI0 displayed in the first window W1, the operator has not a clear view of the distribution of microcalcifications along the axis Z. Making such a visual distinction in the 3D scene 3DS2 between microcalcifications located "on top" of the current slice image and microcalcifications located "below" the current slice image provides such view to the operator.

Geometrical planes helping the operator understand the position of the first group and the second group of central markers MKAT and MKAD may also be drawn along with the 3D scene.

In another embodiment illustrated on FIG. 11, two geometrical planes orthogonal to ce are computed: one "sagittal" plane parallel to the axis X and one "coronal" plane parallel to the axis Y.

In the embodiments described above, the 3D scene focuses on one cluster. In a third embodiment illustrated on FIG. 12, a 3D scene 3DS3 contains "cluster markers" MKCLU, each cluster marker indicating the region of a respective cluster of microcalcification. Each cluster marker may be a closed curve surrounding marker of interests or central markers also displayed in the 3D scene 3DS3.

In such embodiment the 3D scene offers to the operator a global view of all regions of interest in the breast.

The operator may select one of the cluster markers displayed in the 3D scene 3DS3, and then the current slice image displayed in the first window be updated to the target image of the selected cluster marker.

In another embodiment illustrated on FIG. 11, a first and a second geometrical planes showing the first and the second group of microcalcification markers described above are displayed along with the current slice image.

The first geometrical plane represents the section of any microcalcification(s) contained in a coronal plan which is normal to the axis X. The first geometrical plane comprises a line representing the intersection of the coronal plane with the current slice image, the first group of central markers and the second group of central markers. Besides, the first geometrical plane is displayed so as to be aligned with the displayed current slice image along the axis X.

The second geometrical plane represents the section of any microcalcification(s) contained in a sagittal plan which is normal to the axis Y. The second geometrical plane comprises a line representing the intersection of the sagittal plane with the current slice image, the first group of central marker and the second group of central marker. Besides, the second geometrical plane is displayed so as to be aligned with the displayed current slice image along the axis Y.

Biopsy

The image processing unit then sends at least one determined 3D target position (and possibly the associated half-line) to the biopsy positioner P.

The biopsy positioner plants a needle into the breast of the patient towards the 3D target position and tissue is sampled from the target location. The needle comprises a notch through which tissue is collected. This sampling step may be repeated for each determined target position.

The method described above may be extended to 3D volumes defined by more than one set of parallel slice images (for instance, a 3D volume V defined by set of slices and a set of slabs). It is not restricted to breast biopsy but may be applied for any other types of biopsy.

Besides, the methods described above is not limited to the particular case of microcalcifications but can be extended to any region of interest in the breast where to sample tissue from during a biopsy.

The different embodiments of 3D scenes may be displayed simultaneously in different windows on the graphical interface 11.

Moreover, a computer program product comprising code instructions can carry out the method described above when executed by the image processing unit 10.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. Method of processing X-ray images of a breast, the method comprising the steps of:
   generating a 3D volume from a plurality of X-ray images, the 3D volume comprising a set of parallel slice images distributed along a main axis,
   the method being characterized in that it further comprises the steps of
   processing the 3D volume and/or the plurality of X-ray images so as to detect at least one region of interest in the breast,
   computing, for each region of interest in the 3D volume, a 3D characteristic position of the region of interest,
   computing at least one needle target 3D position from a plurality of said computed 3D characteristic positions, each needle target 3D position being a position where tissue contained in corresponding regions of interest can be sampled therefrom,
   associating each needle target position with a target image, said target image being determined from comparing the needle target position with positions of the slice images along the main axis,
   displaying a slice image on a graphical interface, and
   if the current slice image is a target image, displaying on the graphical interface a target marker indicating each needle target position associated with the displayed current slice image.

2. Method of claim 1, further comprising:
   selecting a set of primary images among the slice images, each primary image showing at least one detected microcalcification, and
   selectively displaying and browsing the primary images on the graphical interface.

3. Method of claim 2, further comprising the following steps performed for each detected microcalcification:
   computing a range of positions along the main axis, the sampling region being located within said range,
   electing as primary images slice images having a position along the main axis comprised within said range.

4. Method of claim 2, wherein processing the 3D volume comprises determining in each primary image at least one area containing a section of a region of interest, and wherein the method further comprises displaying a marker of interest highlighting said area for each determined area present in the displayed current slice image.

5. Method of claim 1, further comprising:
   associating each detected region of interest with a central image, the central image being the closest slice image to the 3D characteristic position of the region of interest along the main axis, and
   if the current slice image is a central image, displaying at least one central marker, each central marker indicating the closest position to the 3D characteristic position that is contained in the current slice image.

6. Method of claim 1, wherein each needle target position is the barycenter of a plurality of characteristic positions.

7. Method of claim 1, wherein each needle target position is a position maximizing a probability to sample tissue of region of interests therefrom.

8. Method of claim 1, further comprising a step of constituting clusters, each cluster being associated to a portion of the 3D volume containing a plurality of regions of interest, a needle target position being computed for each cluster from the characteristic positions of the corresponding plurality of regions of interest.

9. Method of claim 1, further comprising the following steps whenever a navigation event triggered by the operator is captured:
  parsing slice images in order of position along the main axis from the current slice image,
  displaying a new slice image in replacement of the current slice image, the new slice image being a first primary or a first central image or a first target image found during parsing.

10. Method of claim 1, wherein the current slice image is displayed with at least one first marker in a first window on the graphical interface, and further comprising displaying a 3D scene in a second window with at least a second marker on the graphical interface, wherein the 3D scene represents a portion of the 3D volume, and both first and second markers indicate a same point of interest in said portion.

11. Method of claim 10, further comprising the following steps if the current slice image displayed in the first window is a target image:
  determining a cluster matching a region of interest shown in the current slice image,
  updating the 3D scene so that the portion of the 3D volume said 3D scene represents contains all regions of interest associated with the determined cluster,
  displaying the 3D scene in the second window, and
  displaying in the second window any marker of interest and/or any central marker and/or any target marker indicating an element of interest contained in said portion.

12. Method of claim 1, wherein a needle target position is recomputed and the corresponding target marker updated accordingly if the current slice image is a target image, after capturing a deletion or a move of a displayed central marker or after capturing the addition of a new central marker.

13. Method of claim 1, further comprising the steps of capturing a central or target marker selection event in the second window, and displaying in the first window a primary image containing the position associated to the marker selected in the second window.

14. Method of claim 1, wherein each 3D characteristic position of a region of interest is a 3D central position of said region of interest.

15. Method of claim 1, wherein each target image is an existing slice image in the volume that is closest to the corresponding needle target position along the main axis.

16. Method of claim 1, wherein each target image is determined by the following sub-steps, if the needle target position does not match any slice image position along the main axis:
  generating a new slice image in the volume at the needle target position from the X-ray images, and
  selecting as target image the created slice image.

17. A non-transitory computer readable medium comprising a computer program product comprising code instructions for carrying out the method of claim 1 when executed by an image processing unit.

18. Device for processing X-ray images, the device comprising an image processing unit, a graphical interface, and an input interface, the device being configured to perform the method of claim 1.

* * * * *